Figure 1:
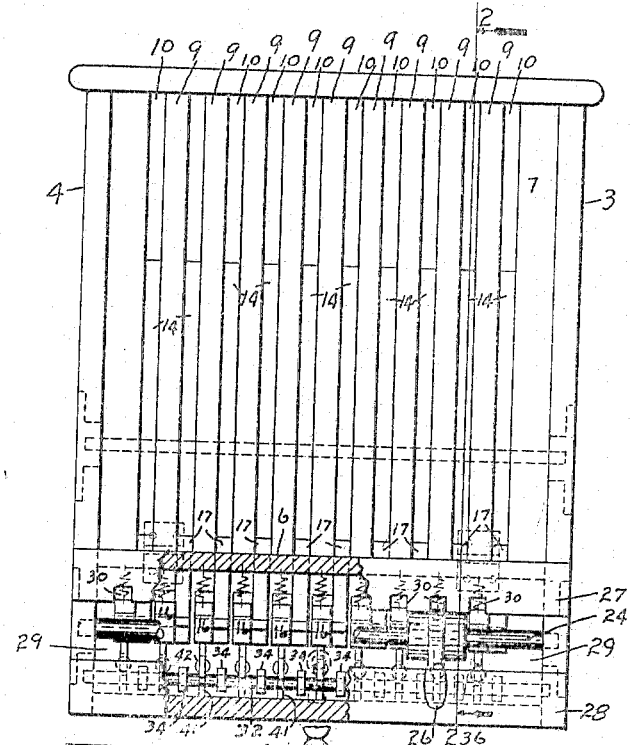

W. STUEBING, Jr. & L. J. VAN GUELPEN.
RECORD FILING MECHANISM.
APPLICATION FILED MAR. 17, 1916.

1,258,498.

Patented Mar. 5, 1918.
3 SHEETS—SHEET 1.

Witnesses

Inventor
Attorney

W. STUEBING, Jr. & L. J. VAN GUELPEN.
RECORD FILING MECHANISM.
APPLICATION FILED MAR. 17, 1916.

1,258,498.

Patented Mar. 5, 1918.
3 SHEETS—SHEET 2.

Witnesses

Inventor
Attorney

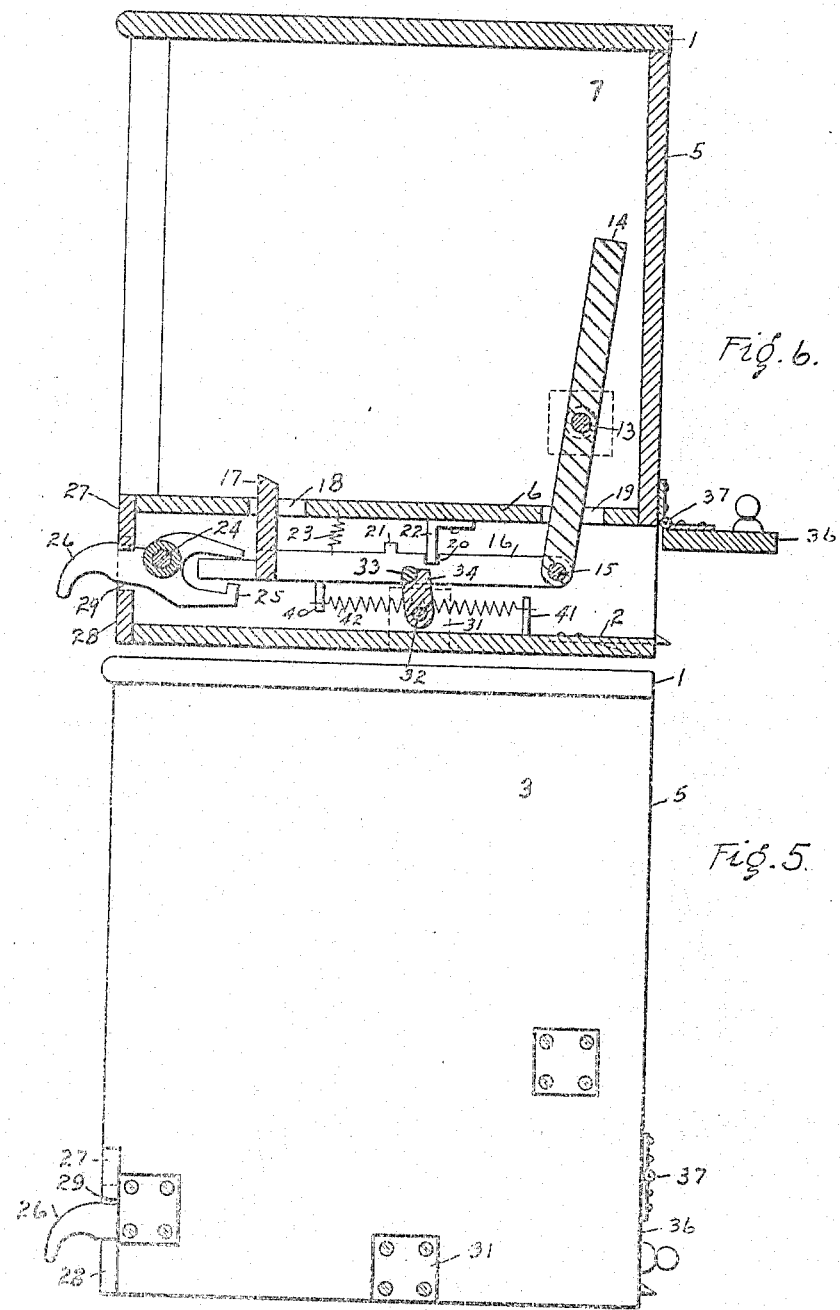

UNITED STATES PATENT OFFICE.

WILLIAM STUEBING, JR., AND LOUIS J. VAN GUELPEN, OF CINCINNATI, OHIO, ASSIGNORS OF SEVEN-SIXTEENTHS TO SAID STUEBING, TWO-SIXTEENTHS TO SAID VAN GUELPEN, AND SEVEN-SIXTEENTHS TO L. A. BURRELL, OF CINCINNATI, OHIO.

RECORD-FILING MECHANISM.

1,258,498.  Specification of Letters Patent.  Patented Mar. 5, 1918.

Application filed March 17, 1916. Serial No. 84,877.

*To all whom it may concern:*

Be it known that we, WILLIAM STUEBING, Jr., and LOUIS J. VAN GUELPEN, both citizens of the United States, and each residing at the city of Cincinnati, in the county of Hamilton and State of Ohio, have invented certain new and useful Improvements in Record-Filing Mechanism, of which the following is a specification.

The object of our invention is to provide a simple, cheap, unique and highly efficient mechanism for filing records; and its salient features lie in providing novel mechanism for withdrawing and filing the record.

One of its features consists in the employment of a case or cabinet, divided into spaced divisions or compartments, each adapted to hold a record, and in providing mechanism in connection with each of said compartments or divisions to be used for receiving the record and for ejecting it, which mechanism, however, can not be used in any of the compartments without placing said mechanism for the compartment to be used, in operative condition by human agency.

Another feature consists in providing mechanism for locking the record in the compartment automatically and automatically ejecting the same.

Another feature consists in providing means for preventing the insertion of a record in any of the compartments or divisions except in the one which has been removed, and when said record is inserted in its compartment and automatically locked in place, none of the records can be removed until separately operated upon by the mechanism for releasing the record; thus preventing taking out of more than one record at a time, thus forcing the operator to take out the records singly and replace the record before taking out another; thus preventing the operator from laying the records around promiscuously, thus saving time and preventing inconvenience in hunting the desired record and preventing loss, destruction and breakage.

Another feature consists in prohibiting the use of any of the compartments for which there are no records, by making the mechanism for said unused compartments inoperative, at will.

Another feature consists in providing mechanism which can be shifted to the operating mechanism of any of the compartments so as to operate the desired compartment separately to procure the desired record.

Another feature consists in making the withdrawn record the key for automatically locking itself back into the compartment from which it has been removed, and automatically releasing the shifting mechanism so that it will be again free to operate the mechanism of another compartment.

It will be readily understood that our device and its mechanism can be used in connection with any cabinet or filing case from which records of any kind are withdrawn and inserted, but for the purpose of perspicuity and reference, we will describe it in connection with the filing cabinet of a talking machine, without, however, limiting ourselves to the specific form of cabinet herein described in detail.

The various features of our invention and their advantages will readily become apparent from a perusal of the following specification and claims.

Figure 4:
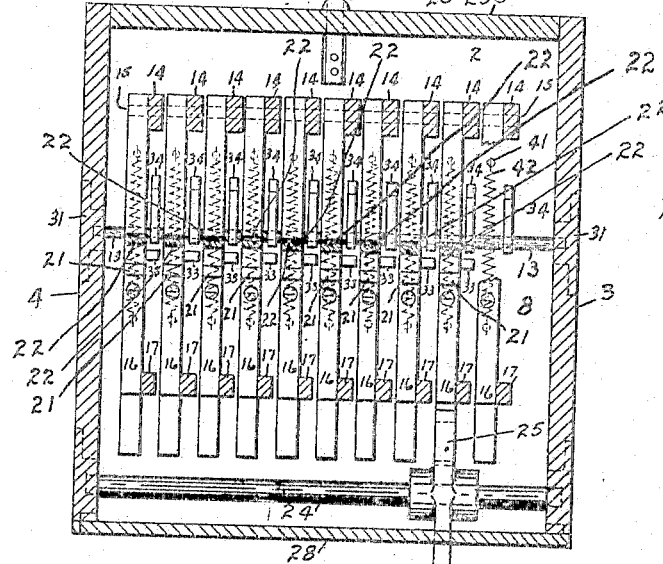
Figure 2:
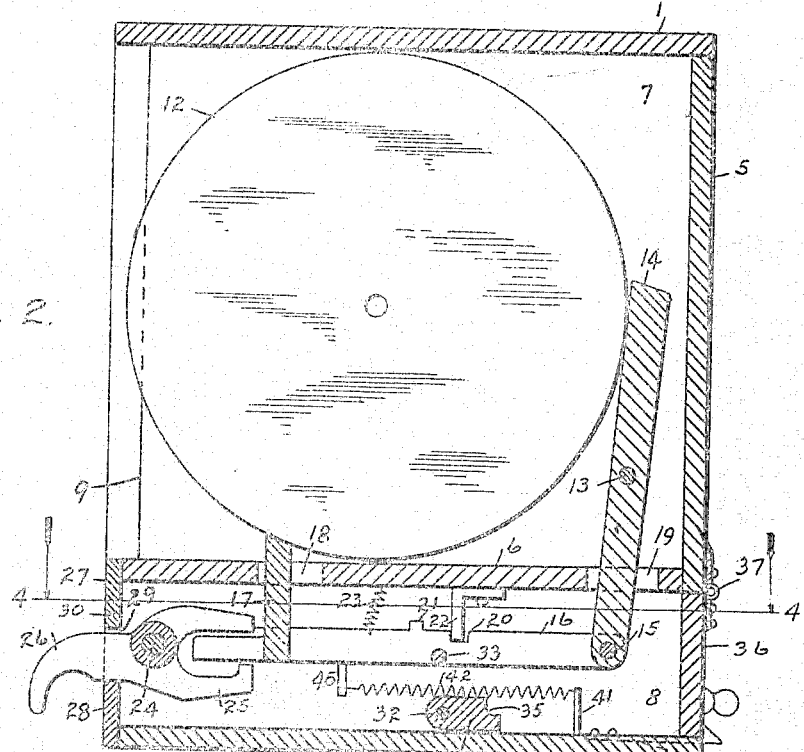
Figure 3:
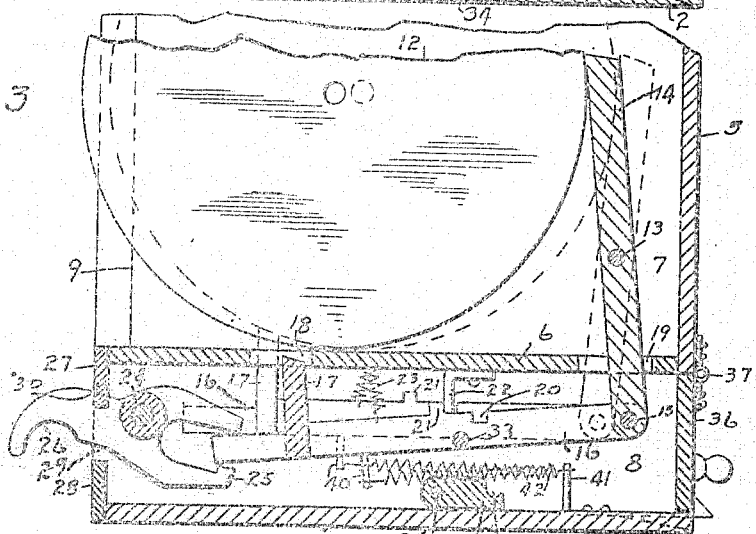

In the accompanying drawings forming part of this specification,

Figure 1, is a front elevation of our invention, partly broken away to illustrate construction, Fig. 2, is a sectional view on line 2—2 of Fig. 1, Fig. 3, is a similar view as that shown in Fig. 2, except it is broken away at top and the operating parts are in a different position, Fig. 4, is a sectional view on line 4—4 of Fig. 2, Fig. 5, is a side elevation of the invention, and Fig. 6, is a sectional view same as Fig. 2, except that the operating mechanism is in a different position.

In carrying out our invention we provide a cabinet or box, formed of a top 1, bottom 2, side walls 3 and 4 and a back 5. The front part of the cabinet is open and we provide a partition 6 which divides the cabinet into an upper chamber 7 and a lower chamber 8; in the chamber 7 we provide a series of partitions 9 so that spaces 10 are formed between them into which the records 12 are placed and in which they rest, these partitions and spaces are of a height and width to allow of a snug fit for the records; the lower chamber containing the operating mechanism. These partitions 9 form spaced compartments or filing divisions between them.

In chamber 7, we extend a shaft 13, said shaft passing through the partitions 9 and spaces 10 and into the side walls 3 and 4, in which said shaft is supported and journaled.

On the shaft 13, in each of the spaces 10, we mount and fulcrum a vertical arm 14; this arm may be of any suitable shape or construction. At the lower end of arm 14, at the point 15, we pivot the rear end of a horizontal bar or long arm 16, provided with an upwardly extending finger 17, passing through a slot 18 in the partition 6; the arm 14 also extending through a slot 19 in partition 6.

This long arm 16 is provided with a recess 20 as shown and is also provided with a stop lug 21, for limiting the movement of arm 16. On the bottom surface of partition 6, we securely fasten a stop finger 22 which fits into the recess 20 when the finger 17 is in its highest position and the long arm 16 is held in this normal position by means of the spring 23. On the long arm 16 we provide a downwardly projecting post 40 and to the bottom 2, we fasten an upwardly extending post 41 and between these two posts we extend and connect a coiled spring 42. The mechanism just described is provided for each space 10 and for each record, shown particularly in Figs. 1 and 4.

In the lower chamber 8 we provide a shaft or bar 24 which is fastened in the sides 3 and 4 and on this shaft is placed a lever having a forked arm 25 and a handle 26; this lever can be slid to and fro on the shaft 24. The forked end 25 engages the forward end of the long arm 16, straddling the same as shown.

At the front of the bottom chamber 8, we fasten the upper rail 27 and the lower rail 28, extending across the device, and forming the elongated slot or space 29 between them. In the upper rail 27 we place vertical recesses 30, into which the handle 26 can enter when up.

In connection with each of the long arms 16, we employ the following described device, for holding the said arm and its connections in inoperative position until it is desired to use said arm and connections, to place a record in said space.

In the lower chamber 8, we place at each side a bearing 31, in which we support shaft 32 extending across the device. On each arm 16 we connect a pin 33 and to co-act with said pin we provide a short lever 34 which pivots on the shaft 32, having a notch 35 at its top edge, which engages said pin 33. When the short lever 34 is up and in a vertical position as shown in Fig. 6, and is in engagement with pin 33, the operating means are all locked against any operation. In order to place the same in operative position, we provide a door 36 hinged at 37, which door extends across the device, which can be unlocked so that the operator can reach the short lever 34 and drop it as shown in Figs. 2 and 3, this allows the parts to be operable.

The spring 42 is always in tension. When the long arm 16 is disconnected from the stop finger 22, as the upper member of the forked part 25 engages said long arm, by reason of the operator lifting up handle 26, see Fig. 3, this tension on spring 42 is partially relaxed and the arm 14 is forced forward at its upper part, engaging the record and throwing it forward, see Fig. 3. During this operation the upper edge of the bar 16 is riding on the lower edge of the finger 22 and is held in this position by the spring 23 and stop 21; at this time the handle 26 is up in the slot 30 and can not be moved to the right or left and is thus locked in this position, at the same time the lower member of fork part 25 is holding the handle up in its position in said slot so that it can not be moved laterally.

When the device is empty and it is desired to load the same, the short lever 34 is dropped, to place the mechanism in operative position, the handle 26 is then slid to the space 10 into which it is desired to insert the record, and then lifted, this forces the upper member of fork 25 to engage the upper end of long arm 16, rocking or tilting said arm, this pulls down the finger 17 so that the record can be started into the space 10 and this operation also forces back the arm 14 by reason of the record pressing against it at the top, said arm 14 thus being pressed back at the top operates upon arm 16 and this operation forces the stop finger 22 to enter recess 20 in arm 16, and the spring 23 pulls up the said arm 16, consequently raising finger 17; this operation also drops the handle 26 and disengages it from the slot 30, and then the record is locked in place, and can not be removed until operated upon as above set forth by the mechanism for ejecting it.

The finger 17 prevents any record from being inserted in any of the compartments, except into the one only from which a record has been extracted, as in this particular compartment the finger is down.

From the above description it will be seen that our improved record filing mechanism, constructed according to our invention, is of an inexpensive and extremely simple nature and is especially well adapted for the purpose for which it is designed, and it will also be obvious from the above description that the same is capable of considerable modification without material departure from the principle and spirit of the invention, and for this reason we wish to be understood as not limiting ourselves to the precise form and arrangement of the several parts of the mechanism as herein set forth, in carrying out our invention in practice, and we wish to be understood that such modifications will still fall within the scope of our invention.

What we claim as new and our invention and desire to secure by Letters Patent is:

1. In record filing mechanism, a cabinet for separately holding the records to be filed, means, operated by the record, for locking said record in place.

2. In a record filing mechanism, a cabinet having immovable compartments for separately holding the records to be filed, means for withdrawing a record, means operated by the withdrawal of the record itself for preventing the insertion or withdrawal of another record in the cabinet, until a record has been inserted in the immovable compartment from which the record was withdrawn.

3. In record filing mechanism, a series of compartments for holding records separately, means for ejecting said records singly, said means operated by the record for locking said record in place, and separate mechanism capable of lateral movement for engaging each compartment mechanism separately.

4. In a record filing mechanism, a cabinet provided with immovable compartments for separately holding the records to be filed, mechanism for ejecting only one record at a time, and separate means for independently locking the ejecting mechanism, rendering it inoperative.

5. In a record filing mechanism, a cabinet having compartments for singly holding the records to be filed, means for singly ejecting the records from said compartments, means for singly locking the same in said compartments, and separate and independent means for locking the empty compartments not in use, rendering such unused compartments inoperative for receiving records.

6. In a record filing mechanism, a cabinet for separately holding the records to be filed, means, operated by the record, for locking said record in place, and separate independent means for rendering the unused compartments inoperative against the insertion of a record.

WILLIAM STUEBING, Jr.
LOUIS J. VAN GUELPEN.

Witnesses:
L. M. DUNLAP,
W. C. STUEBING.